United States Patent
Sung (10) Patent No.: US 9,271,452 B2
(45) Date of Patent: Mar. 1, 2016

(54) GREEN WALL PLANTING SUPPORT APPARATUS AND A HANGING PLATE THEREOF

(71) Applicant: Gerald Sung, Chiayi (TW)

(72) Inventor: Gerald Sung, Chiayi (TW)

( * ) Notice: Subject to any disclaimer, the term of this patent is extended or adjusted under 35 U.S.C. 154(b) by 247 days.

(21) Appl. No.: 13/938,674

(22) Filed: Jul. 10, 2013

(65) Prior Publication Data

US 2014/0115963 A1    May 1, 2014

(30) Foreign Application Priority Data

Nov. 1, 2012  (TW) .............................. 101221158 A (51) Int. Cl.
*A01G 9/02* (2006.01)
(52) U.S. Cl.
CPC ............... *A01G 9/025* (2013.01); *Y02P 60/244* (2015.11)
(58) Field of Classification Search
CPC ..... A01G 9/022; A01G 27/005; A01G 9/023; A01G 9/025; A01G 9/104; A01G 9/024; A01G 27/006; A01G 31/06; A01G 9/027; A01G 9/12; A47G 7/044; Y02P 60/244
See application file for complete search history.

(56) References Cited

U.S. PATENT DOCUMENTS

| | | | | |
|---|---|---|---|---|
| 4,295,296 | A * | 10/1981 | Kinghorn | 47/82 |
| 5,074,504 | A * | 12/1991 | Minnick | 248/312.1 |
| 5,405,116 | A * | 4/1995 | Shepherd et al. | 248/312.1 |
| 2009/0300984 | A1* | 12/2009 | Gordon | 47/66.7 |
| 2011/0016784 | A1* | 1/2011 | Taber | 47/79 |
| 2011/0084088 | A1* | 4/2011 | Scribner et al. | 220/751 |
| 2011/0107667 | A1* | 5/2011 | Laurence et al. | 47/59 S |
| 2011/0192081 | A1* | 8/2011 | MacKenzie | 47/66.6 |
| 2013/0152467 | A1* | 6/2013 | Chang | 47/82 |
| 2014/0075840 | A1* | 3/2014 | Gosling et al. | 47/81 |
| 2014/0252820 | A1* | 9/2014 | Botello et al. | 297/188.04 |

* cited by examiner

*Primary Examiner* — Kathleen Alker
(74) *Attorney, Agent, or Firm* — Ladas & Parry, LLP (57) ABSTRACT

A green wall planting support apparatus includes at least one hanging plate, a plurality of containers and a water supply system. The hanging plate includes a channel portion that is elongated in a lengthwise direction of the hanging plate and that has a first channel, and a hanging portion that is made in one piece with the channel portion and that is disposed in the lengthwise direction. The containers are detachably connected to the hanging plate for receiving plant and each includes a hanger portion that is detachably connected to the hanging portion. The water supply system includes at least one water dispensing unit that is mounted on the channel portion for conveying water to the container.

6 Claims, 8 Drawing Sheets

GREEN WALL PLANTING SUPPORT APPARATUS AND A HANGING PLATE THEREOF

CROSS-REFERENCE TO RELATED APPLICATION

This application claims priority from Taiwanese Application No. 101221158, filed on Nov. 1, 2012, the disclosure of which is incorporated herein by reference in its entirety.

BACKGROUND OF THE INVENTION

1. Field of the Invention

The invention relates to a green wall planting support apparatus, more particularly to a green wall planting support apparatus with a hanging plate adapted for stand-up growth of plants.

2. Description of the Related Art

Figure 1:
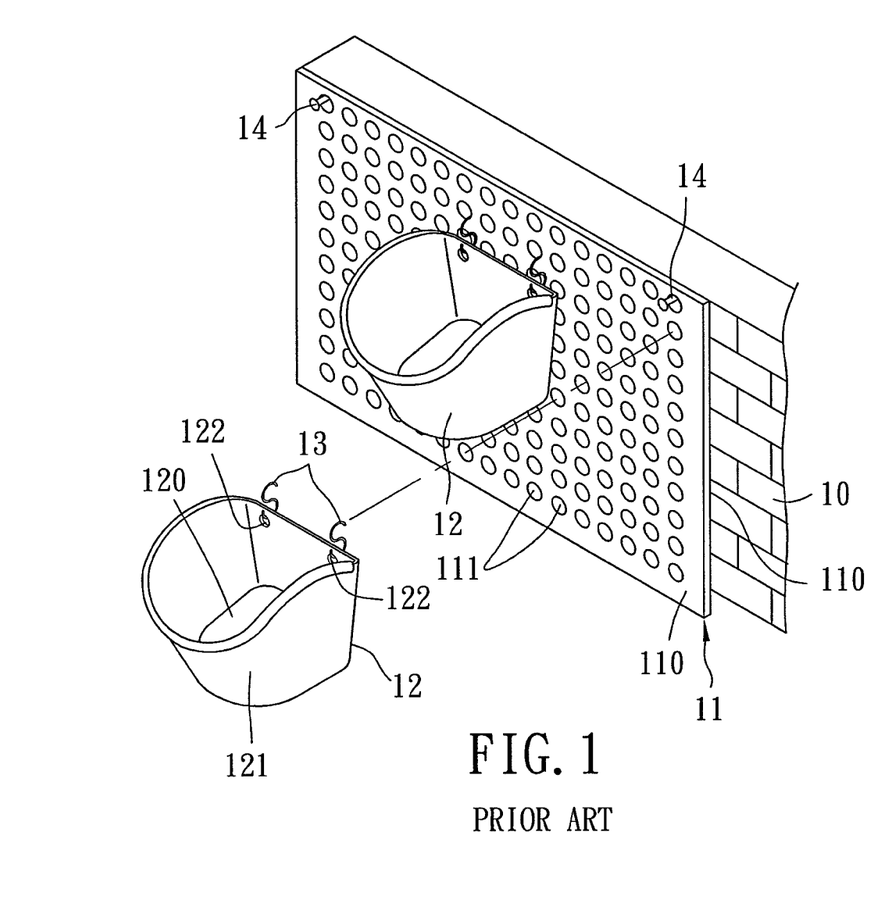
FIG. 1 is a schematic perspective view, illustrating a conventional green wall planting support apparatus.

FIG. 1 illustrates a conventional green wall planting support apparatus that is mounted on a wall 10 through a plurality of nails 14. The conventional green wall planting support apparatus includes a main plate 11 that is made in one piece from plastics, a plurality of hanging baskets 12 that support plants, and a plurality of hooks 13 that detachably connect the hanging baskets 12 to the main plate 11. The main plate 11 has two opposite plate surfaces 110 and a plurality of circular holes 111 that extend through the plate surfaces 110. Each of the hanging baskets 12 has a surrounding wall 121 that defines a plant-receiving space 120 and that has two spaced-apart hook holes 122. Each of the hanging baskets 12 is hung on the main plate 11 through engagement between the two hook holes 122 and the corresponding two hooks 13.

In the conventional green wall planting support apparatus, the hanging baskets 12 are made from plastics like the main plate 11. The hooks 13 are in pairs and each pair of the hooks 13 are engaged with the corresponding hook holes 122 and the corresponding circular holes 111, such that the hanging baskets 12 are hung on the main plate 11. Although the conventional green wall planting support apparatus is suitable for stand-up growth of plants, the main plate 11 has to be made by injection molding techniques. As a result, the production cost of the main plate 11 is relatively high and the resulting main plate 11 has a fixed dimension that is not available for height or width adjustment with respect to various requirements in different applications.

When the conventional green wall planting support apparatus is in use, the hanging baskets 12 are spaced apart from each other in a top-bottom direction relative to the main plate 11. However, it is required to preserve a predetermined space between any adjacent two hanging baskets 12 in the top-bottom direction for growth of the plant. Such arrangement may cause relatively unaesthetic appearance due to the predetermined spaces that has yet to be covered by the plants and tend to reduce a desired greenery effect of the conventional green wall planting support apparatus. Moreover, the conventional green wall planting support apparatus merely provides the spaces for placing the plants but lacks a watering apparatus for the plants, and thus, watering of the plants cannot be conveniently carried out.

SUMMARY OF THE INVENTION

Therefore, an object of the present invention is to provide a green wall planting support apparatus that can overcome the aforesaid drawbacks of the prior art.

According to one aspect of this invention, a green wall planting support apparatus adapted to be mounted on a wall includes at least one hanging plate, a plurality of containers, and a water supply system.

The hanging plate includes a channel portion that is elongated in a lengthwise direction of the hanging plate and that is adapted for connection to the wall, and a hanging portion that is made in one piece with the channel portion and that is disposed in the lengthwise direction. The channel portion has a first channel.

The containers are detachably connected to the hanging plate. Each of the containers includes a receiving portion that is adapted to receive plant, and a hanger portion that is detachably connected to the hanging portion.

The water supply system includes at least one water dispensing unit that is mounted on the channel portion and that is adapted to convey water to the containers.

According to another aspect of this invention, a hanging plate for a green wall planting support apparatus is adapted to be connected to a wall and includes a channel portion and a hanging portion.

The channel portion is elongated in a lengthwise direction of the hanging plate and is adapted for connection to the wall. The channel portion has a first channel.

The hanging portion is made in one piece with the channel portion and extends in the lengthwise direction.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
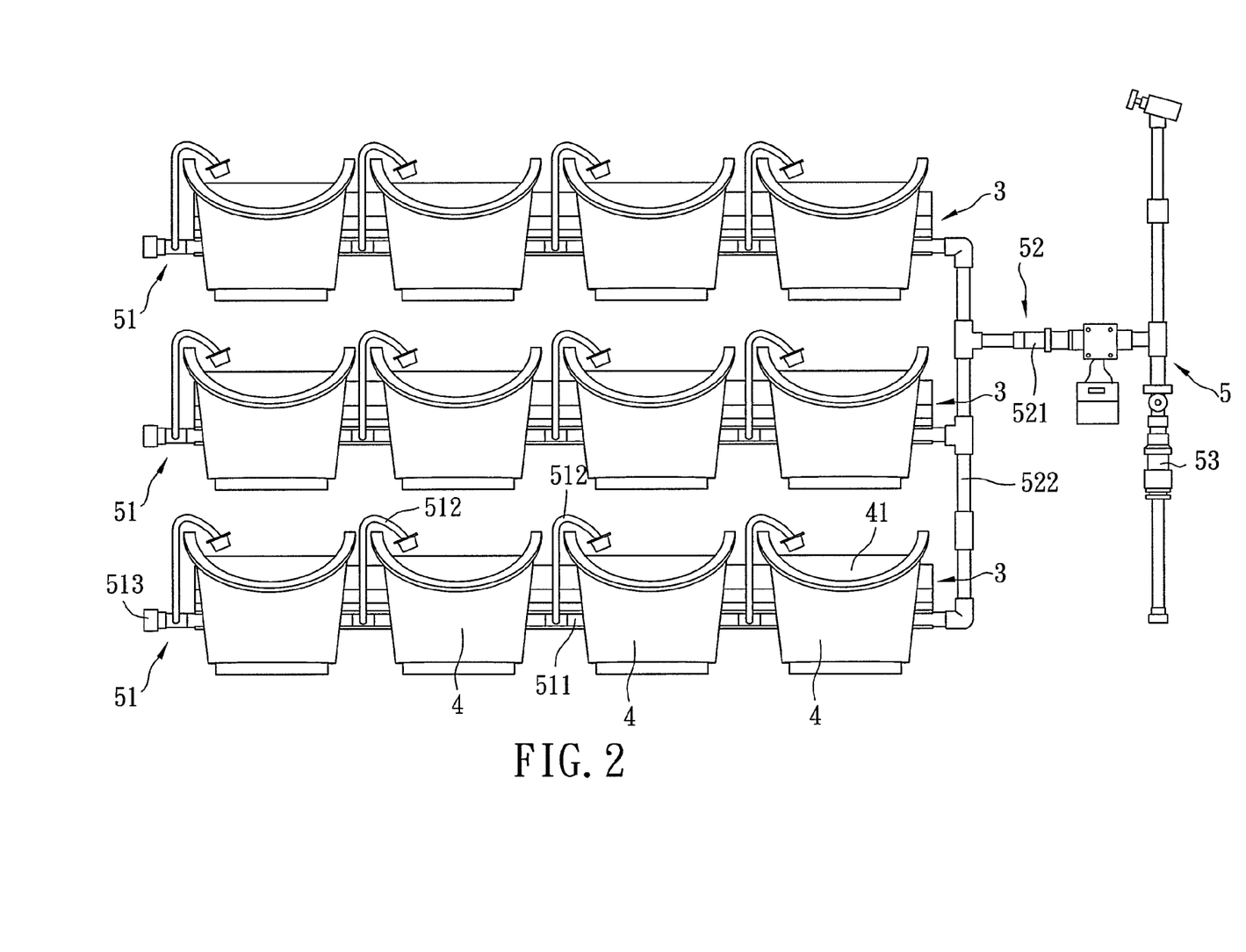
FIG. 2 is a front schematic view, illustrating the first preferred embodiment of a green wall planting support apparatus according to the present invention.
Figure 3:
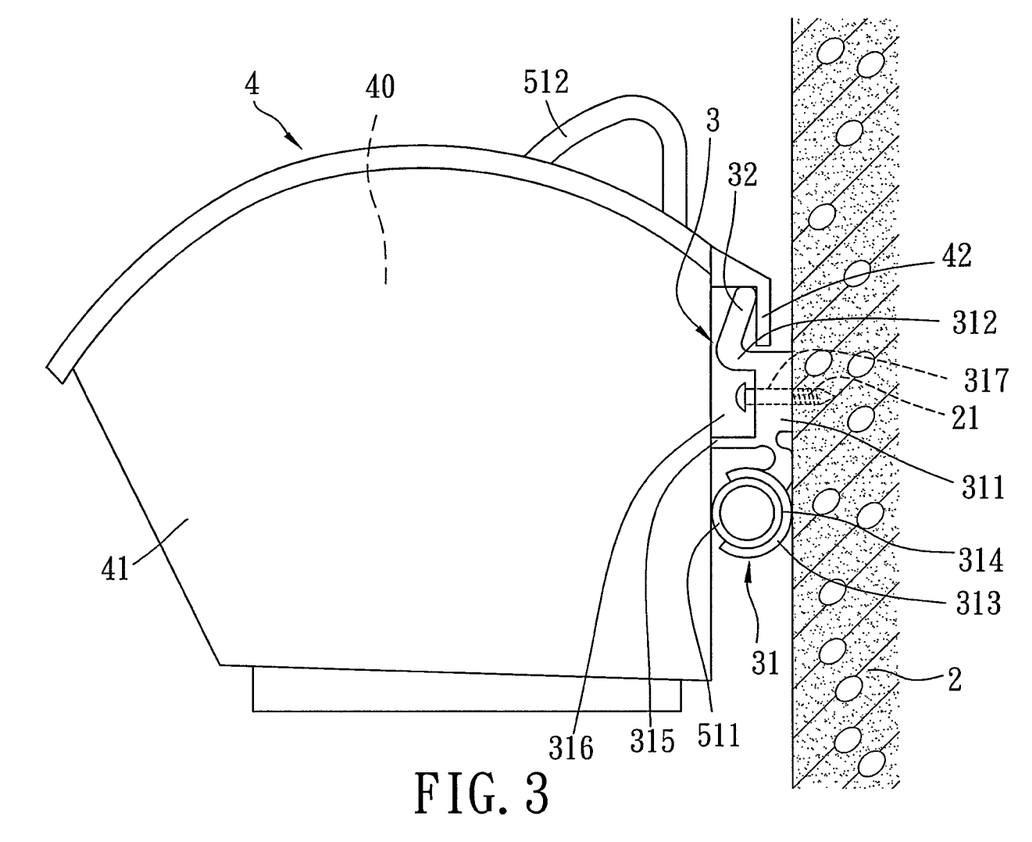
FIG. 3 is a partly sectional side view of the first preferred embodiment.
Figure 4:
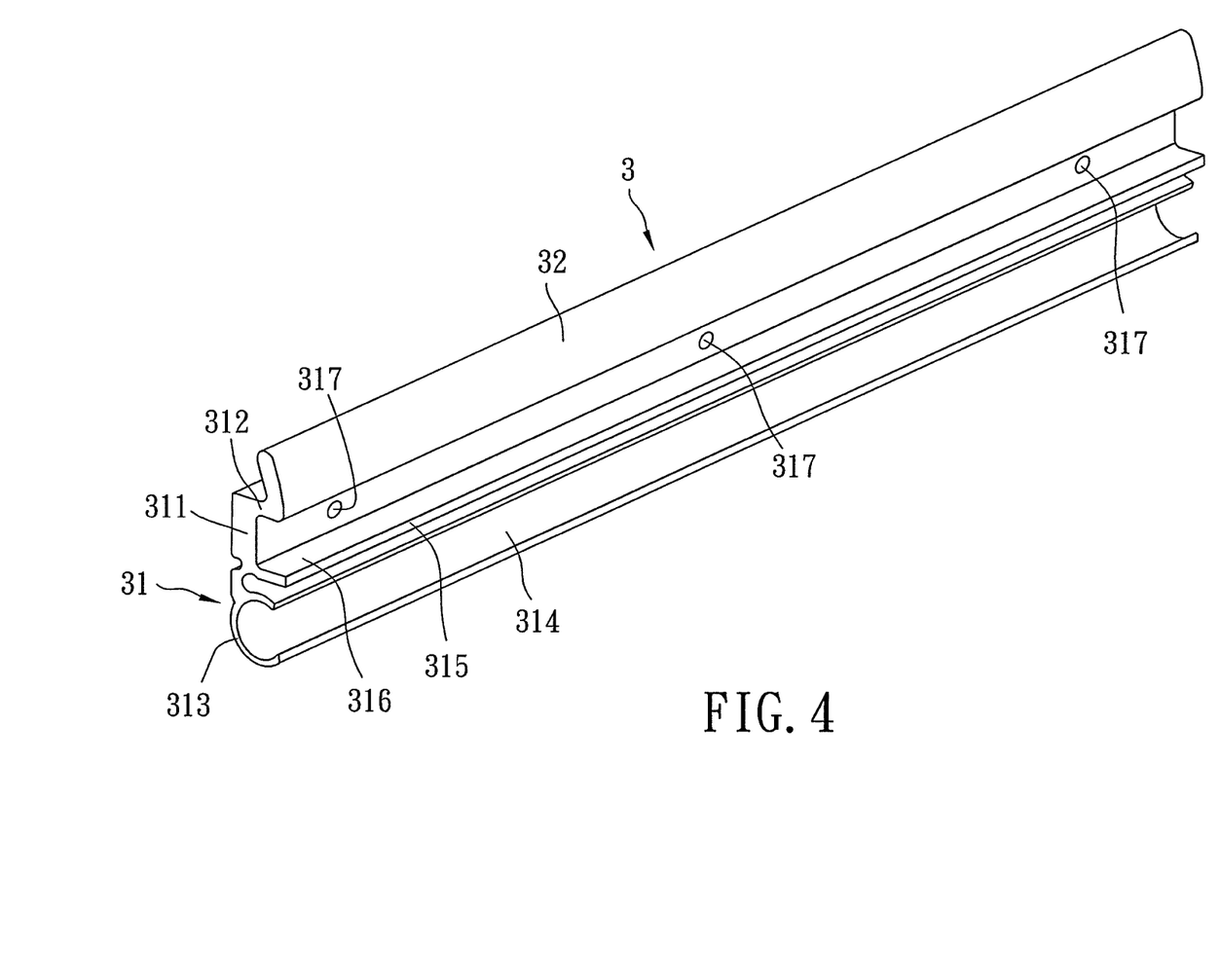
FIG. 4 is a perspective view of a hanging plate of the first preferred embodiment.

Referring to FIGS. 2 to 4, the first preferred embodiment of a green wall planting support apparatus according to the present invention is adapted to be mounted on a wall 2. The wall 2 has a plurality of fasteners 21 that are arranged in vertical rows (only one fastener 21 that is exemplified by a nail is shown in FIG. 3). The green wall planting support apparatus includes at least one hanging plate 3, a plurality of containers 4, and a water supply system 5.

The hanging plate 3 includes a channel portion 31 that is elongated in a lengthwise direction of the hanging plate 3 and that is adapted for connection to the wall 2, and a hanging portion 32 that is made in one piece with the channel portion 31 and that is disposed in the lengthwise direction. The channel portion 31 has a first channel 314. Preferably, the hanging plate 3 is wholly fabricated in one piece by extrusion molding techniques. The channel portion 31 has a vertical base wall 311 that is attached to a front side of the wall 2 and a projecting wall 312 that projects horizontally from the vertical base wall 311 in a forward direction opposite to the wall 2. The hanging portion 32 is integrally formed with the projecting wall 312. Preferably, the channel portion 31 further has a channel wall 313 that is integrally connected to the vertical base wall 311, that more preferably, extends downwardly from a bottom of the vertical base wall 311 and projects crookedly in the forward direction opposite to the wall 2, and that confines the first channel 314. More preferably, the channel portion 31 further has a partition wall 315 that is parallel with the projecting wall 312 and that integrally projects from the vertical base wall 311 in the forward direction opposite to the wall 2, and a second channel 316 that is disposed between the partition wall 315 and the projecting wall 312. In this embodiment, the first and second channels 314, 316 are parallel with each other and are elongated in the lengthwise direction of the hanging plate 3. In this embodiment, the hanging portion 32 extends upwardly and inclines gradually backward from a front edge of the projecting wall 312 distal from the vertical base wall 311. Preferably, the hanging portion 32 is parallel with and spatially distal from the first channel 314 and the first channel 314 is situated beneath the hanging portion 32. In this embodiment, the green wall planting support apparatus includes a plurality of the hanging plates 3 that are spaced apart from each other in a vertical direction (See FIG. 2). More preferably, the channel portion 31 of each hanging plate 3 is provided with a plurality of through holes 317 that respectively extend through the vertical base wall 311 and that are respectively disposed in the second channel 316, such that the fasteners 21 can be respectively inserted into the through holes 317 and secure each of the hanging plates 3 to the wall 2.

In this embodiment, the containers 4 are grouped into three rows. Each row of the containers 4 is detachably connected to a respective one of the hanging plates 3. Each container 4 in each row includes a receiving portion 41 that has a receiving space 40 (see FIG. 5) for accommodating a plant or a flowerpot, and a hanger portion 42 that is detachably connected to the hanging portion 32 of the respective one of the hanging plates 3. In this embodiment, the containers 4 are formed into baskets. The hanger portion 42 of each container 4 extends rearward and is bent downwardly from a top of the receiving portion 41. However, the shape or dimension of the containers 4 are not limited to this embodiment and can be varied according to the actual application.

The water supply system 5 includes at least one water dispensing unit 51 that is mounted on the channel portion 31 and that is adapted to convey water to the containers 4. In this embodiment, the water supply system 5 includes a plurality of the water dispensing units 51. Each of the water dispensing units 51 has a main pipe 511 that is mounted in the first channel 314 of a respective one of the hanging plates 3, and a plurality of branch conduits 512 that are connected to the main pipe 511. Each of the branch conduits 512 is adapted to convey water into the receiving space 40 of a respective one of the containers 4. In this embodiment, each of the water dispensing units 51 further has an end connector 513 mounted on a corresponding end of the main pipe 511. The end connector 513 is a quick connector that can be conveniently connected to the main pipe 511 of another water dispensing unit 51. In addition, the end connector 513 prevents water from flowing out of the corresponding end of the main pipe 511 when the main pipe 511 is not connected to another water dispensing unit 51. Since the feature of this invention does not reside in the end connector 513, which may be readily appreciated by those skilled in the art, details of the same are omitted herein for the sake of brevity.

Preferably, the water supply system 5 further includes a water supply pipe 53 for connecting to a water source, and a manifold unit 52 that connects the water dispensing units 51 to the water supply pipe 53. In this embodiment, the manifold unit 52 has a connection pipe 521 and a manifold pipe 522 that connects the main pipe 511 of each of the water dispensing units 51 to the connection pipe 521. The water supply pipe 53 is connected to the connection pipe 521 and conveys water from the water source.

In use of the green wall planting support apparatus, according to dimension of the wall 2 and heights of the plants, the hanging plates 3 are spaced apart from each other in the vertical direction and are hung on the wall 2. The water dispensing units 51 are respectively mounted in the hanging plates 3. The containers 4 are respectively hung on the hanging portions 32 of the hanging plates 3 and the plants are planted or received in the receiving spaces 40 of the containers 4, respectively. When the supply pipe 53 conveys water into the manifold unit 52, the water dispensing units 51 respectively carry water to the receiving spaces 40 of the containers 4 and thus, the plants accommodated in the green wall planting support apparatus are conveniently watered. Moreover, the water dispensing units 51 may be designed to spray water under a relatively low pressure so as to achieve a water mist effect. For example, a low pressure water mist nozzle is used to spray a mist of water on the plants. Alternatively, the main pipe 511 of each of the water dispensing units 51 may also be mounted in the second channel 316 of a respective one of the hanging plates 3.

Figure 5:
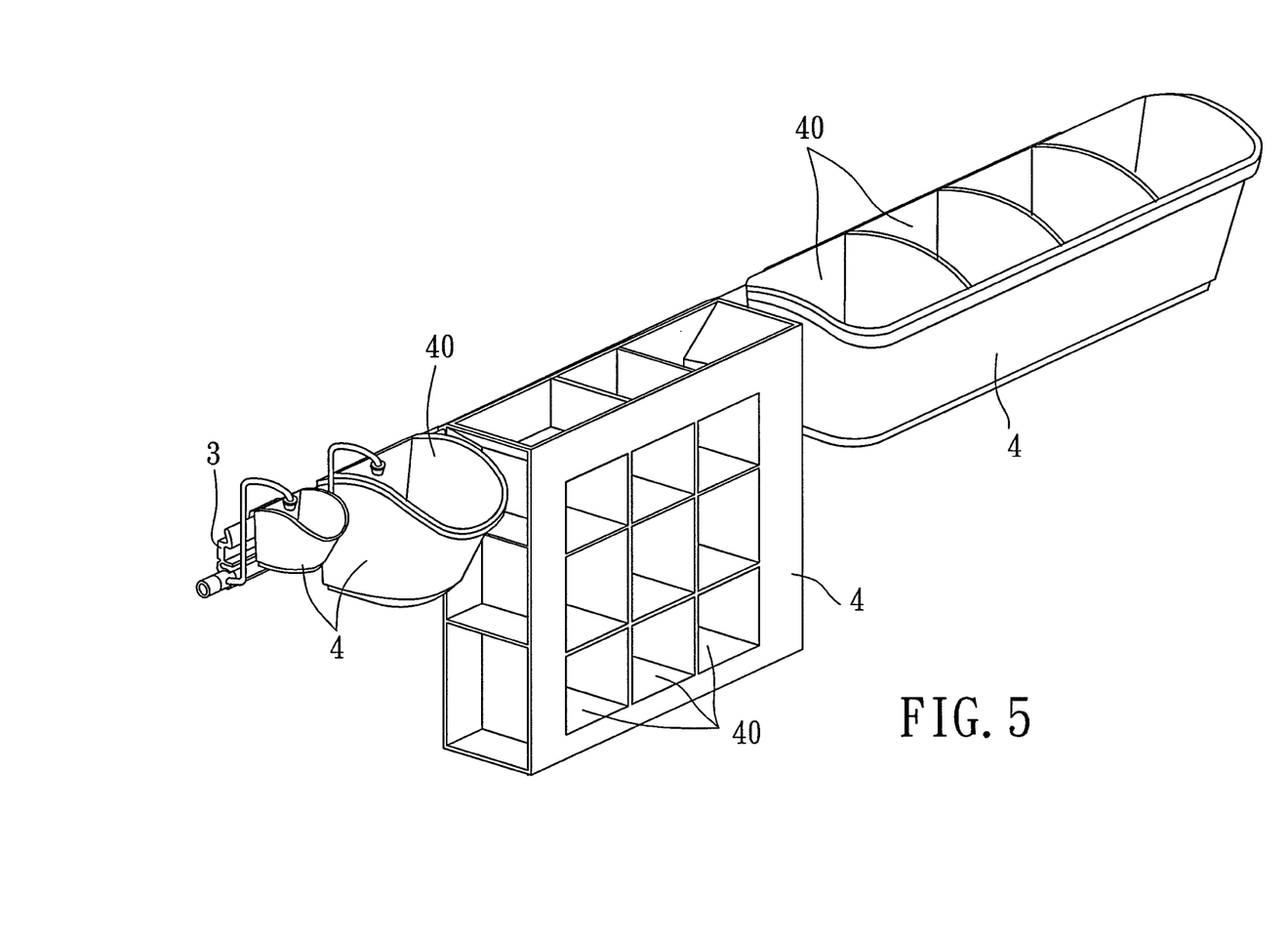
FIG. 5 is a perspective view, illustrating the second preferred embodiment of a green wall planting support apparatus according to the present invention.

FIG. 5 shows the second preferred embodiment of a green wall planting support apparatus according to this invention. The green wall planting support apparatus includes the same hanging plate 3 as that of the first preferred embodiment, and a plurality of the containers 4 that are detachably connected to the hanging plate 3 and that are made in various shapes and dimensions, such as baskets having different dimensions, or a box having a plurality of spaced-apart receiving spaces 40 that are arranged in both vertical and horizontal directions, or in only the horizontal direction. By virtue of the various shapes and structures, the containers 4 are provided to receive different plants of different sizes.

Figure 6:
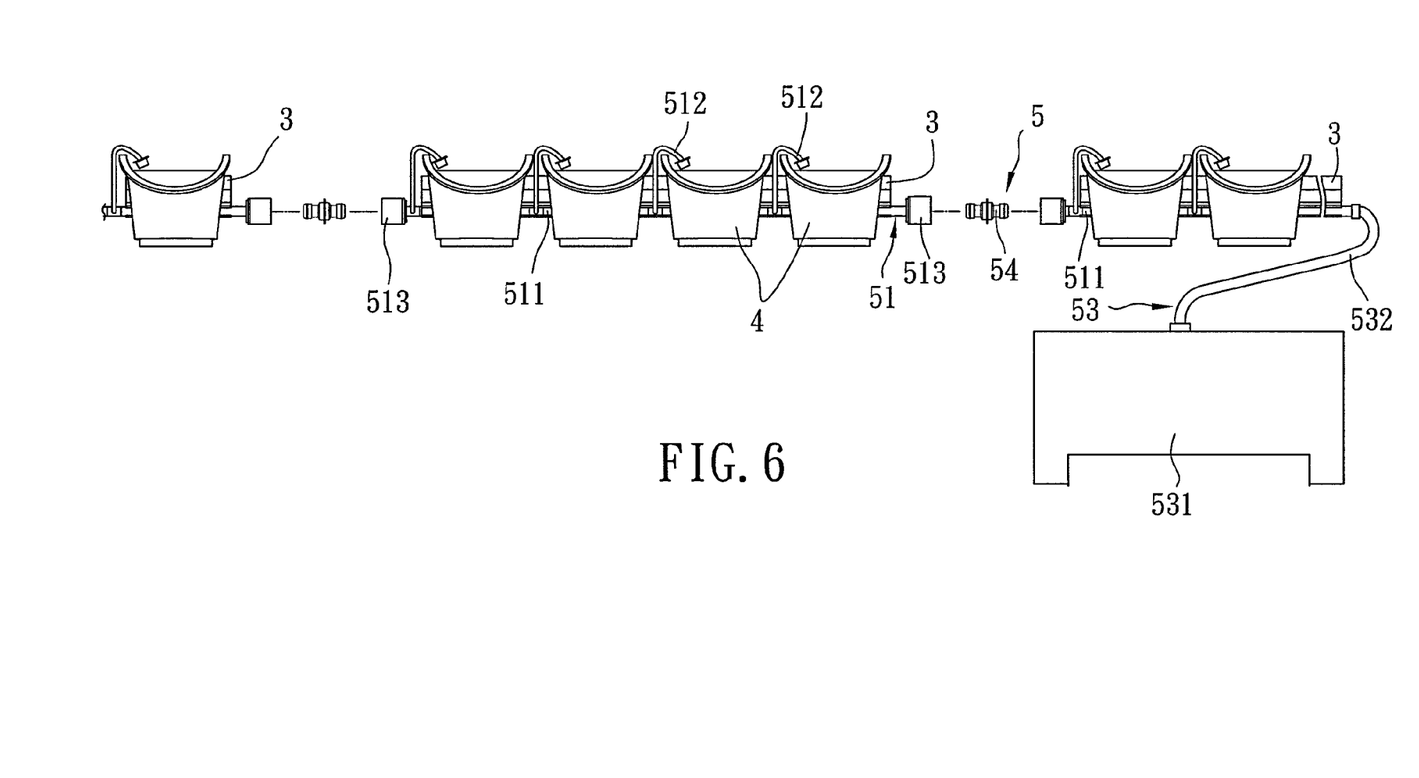
FIG. 6 is a partly exploded front schematic view, illustrating the third preferred embodiment of a green wall planting support apparatus according to the present invention.

FIG. 6 shows the third preferred embodiment of a green wall planting support apparatus according to this invention. The green wall planting support apparatus includes the hanging plates 3 and the containers 4 with structures generally similar to those of the first preferred embodiment except that the hanging plates 3 of this embodiment are spaced apart from each other in the horizontal direction. In this embodiment, the green wall planting support apparatus includes a water supply system 5 that includes a plurality of the water dispensing units 51 that are respectively mounted in the hanging plates 3. Each of the water dispensing units 51 has a main pipe 511 that is mounted in the first channel 314 of the respective one of the hanging plates 3, a plurality of branch conduits 512 that are connected to the main pipe 511 to convey water into the containers 4, respectively, and a pair of the end connectors 513 that are respectively connected to two opposite ends of the main pipe 511. Preferably, the water supply system 5 further includes a plurality of two-way connectors 54 each of which interconnects two adjacent end connectors 513 that are respectively connected to the main pipes 511 of two adjacent ones of the water dispensing units 51, and a water supply unit 53 that is adapted to supply water to the water dispensing units 51. In this embodiment, the water supply unit 53 has a water supply tank 531 and a water supply conduit 532 that is connected to the water supply tank 531 and one of the water dispensing units 51. The water supply unit 53 is based on a water pump design. By virtue of changing the arrangement of the hanging plates 3 and the structure of the water supply unit 5, the type or size of the plants available to be planted or watered by the green wall planting support apparatus is more flexible.

Figure 7:
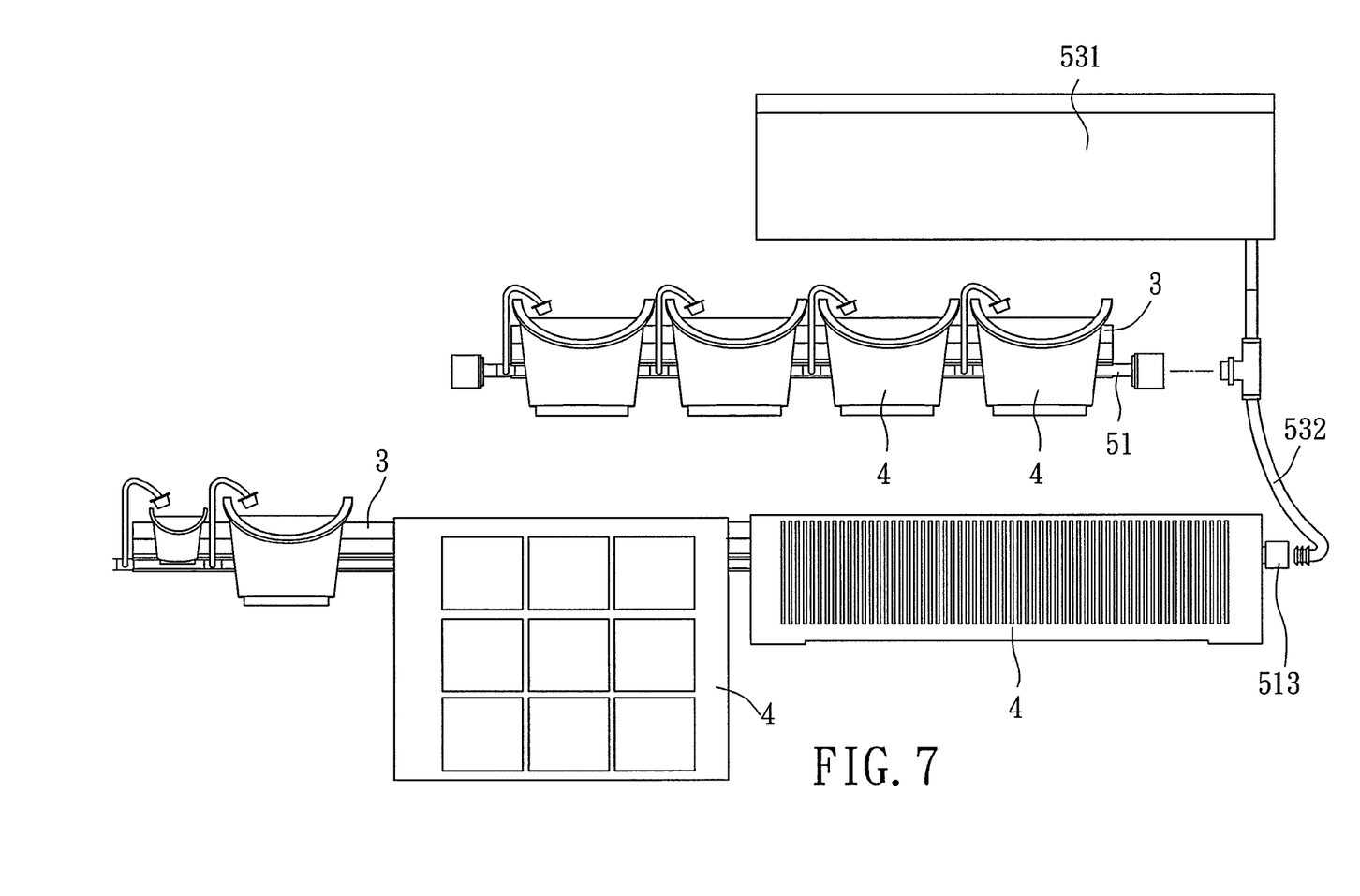
FIG. 7 is a partly exploded front schematic view, illustrating the fourth preferred embodiment of a green wall planting support apparatus according to the present invention.

FIG. 7 shows the fourth preferred embodiment of a green wall planting support apparatus according to this invention, which has a structure generally similar to that of the third preferred embodiment except that the hanging plates 3 are spaced apart from each other in a vertical direction and that the containers 4 hung on each of the hanging plates 3 are different in size and shape. The water supply unit 5 is situated above the hanging plates 3 and the containers 4, such that the water supply conduit 532 conveys water from the water supply tank 531 by virtue of gravity to each of the water dispensing units 51.

Figure 8:
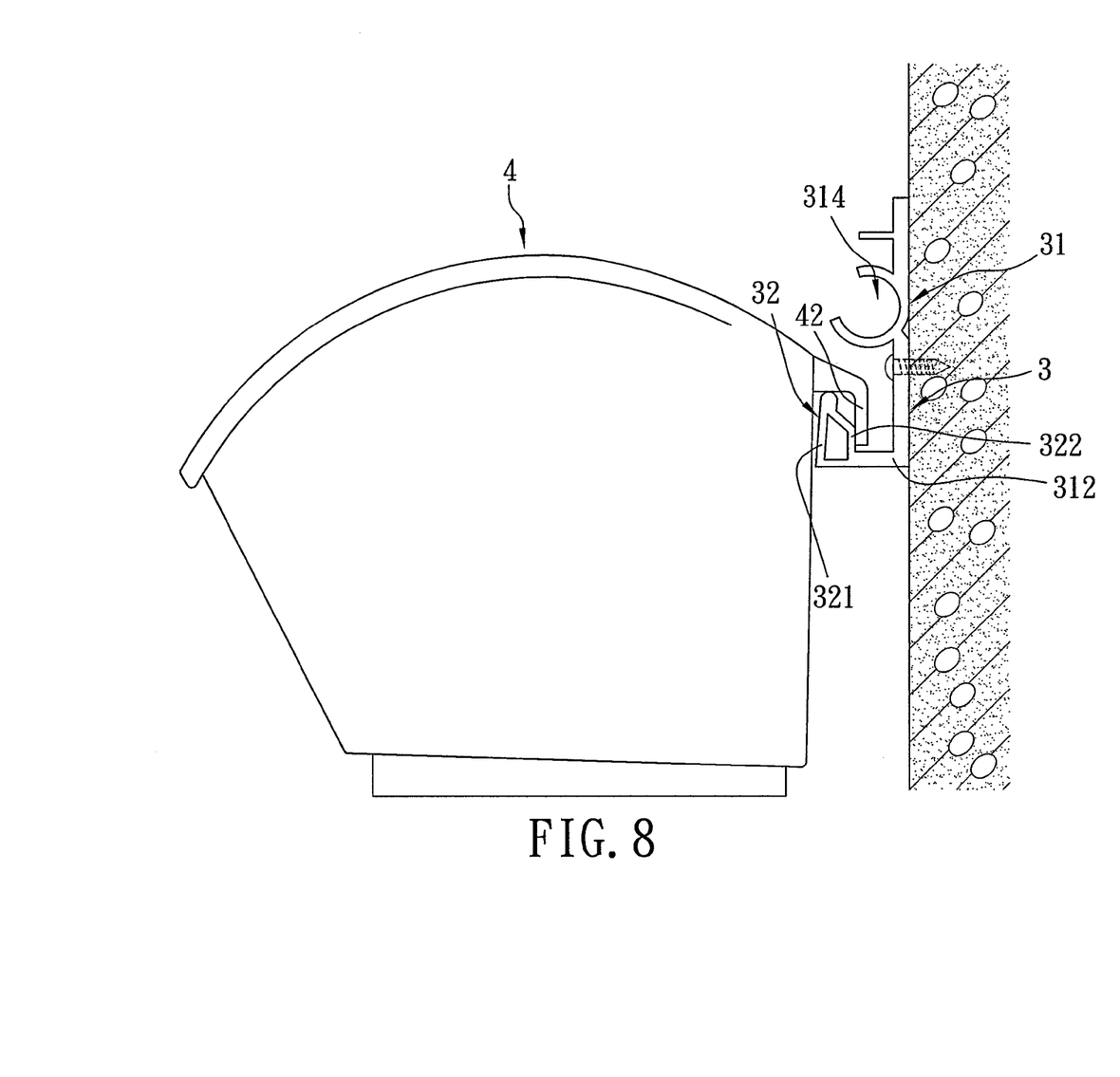
FIG. 8 is a partly sectional view of the fifth preferred embodiment.

FIG. 8 shows the fifth preferred embodiment of a green wall planting support apparatus according to this invention, which has a structure generally similar to that of the first preferred embodiment except that the first channel 314 of each hanging plate 3 is situated above the hanging portion 32. The hanging portion 32 has an upright segment 321 that extends upwardly and vertically from the projecting wall 312, and a connection segment 322 that extends rearward and downwardly from a top end of the upright segment 321 and that is connected to the projecting wall 312. The hanger portion 42 of each of the containers 4 is in abutment with the connection segment 322 when being hung on the hanging portion 32 of the respective one of the hanging plates 3.

To sum up, since the hanging plates 3 have the same cross section and are elongated in the lengthwise direction thereof, the hanging plates 3 are easily manufactured by extrusion molding techniques and can be cut into desired lengths. The water dispensing units 51 of the water supply system 5 are suitably and respectively mounted in the hanging plates 3. In use, based on a consumer's requirement, the hanging plates 3 that are equipped with the water dispensing units 51 may be customized to be spaced apart from each other in vertical or horizontal directions. In addition, since the hanging plates 3 are only required to provide support to the containers 4 and to facilitate installation of the water dispensing units 51, the height of the hanging plates 3 in the vertical direction may be smaller than that of the containers 4. Hence, the hanging plates 3 are hidden behind the containers 4 and the plants. Accordingly, the green wall planting support apparatus not only has an improved greenery effect, but also facilitates watering of the plants received therein.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A green wall planting support apparatus adapted to be mounted on a wall, comprising:
    a plurality of hanging plates each including a channel portion that is elongated in a lengthwise direction of said hanging plate and that is adapted for connection to the wall, and a hanging portion that is made in one piece with said channel portion and that is disposed in the lengthwise direction, said channel portion having a first channel, said hanging plates being spaced apart from each other in a vertical direction;
    a plurality of containers detachably connected to said hanging plates and each of said containers including a receiving portion that is adapted to receive a plant, and a hanger portion that is detachably connected to said hanging portion of a corresponding one of said hanging plates; and
    a water supply system including a plurality of water dispensing units each of which is mounted on said channel portion of a respective one of said hanging plates and each of which is adapted to convey water to said containers, each of said water dispensing units having a main pipe that is mounted in said first channel of the respective one of said hanging plates and a plurality of branch conduits that are connected to said main pipe, each of said branch conduits being adapted to convey water into said receiving space of a respective one of said containers,
    wherein said receiving portion of each of said containers has a receiving space, said water supply system further including a water supply pipe and a manifold unit that connects said water dispensing units to said water supply pipe.

2. The green wall planting support apparatus as claimed in claim 1, wherein, for each of said hanging plates, said channel portion of has a vertical base wall and a projecting wall that projects horizontally from said vertical base wall in a forward direction opposite to the wall, and said hanging portion is integrally formed with said projecting wall.

3. The green wall planting support apparatus as claimed in claim 2, wherein said channel portion of each of said hanging plates further has a channel wall that is integrally connected to said vertical base wall and that defines said first channel.

4. The green wall planting support apparatus as claimed in claim 3, wherein said first channel of said channel portion of each of said hanging plates is situated beneath said hanging portion.

5. The green wall planting support apparatus as claimed in claim 4, wherein said hanging portion of each of said hanging plates extends upwardly and inclines gradually backward from a front edge of said projecting wall distal from said vertical base wall.

6. The green wall planting support apparatus as claimed in claim 5, wherein said channel portion of each of said hanging plates further has a partition wall that is parallel with said projecting wall and that integrally projects from said vertical base wall in the forward direction opposite to the wall, and a second channel that is disposed between said partition wall and said projecting wall.

* * * * *